US012703178B2

(12) United States Patent
Ye

(10) Patent No.: US 12,703,178 B2
(45) Date of Patent: Aug. 11, 2026

(54) INTEGRATED DUST-FREE REVERSE FILM APPLICATION BOX

(71) Applicant: Dongguan Yuanpu Technology Co., Ltd, Dongguan (CN)

(72) Inventor: Delong Ye, Dongguan (CN)

(73) Assignee: Dongguan Yuanpu Technology Co., Ltd, Dongguan (CN)

( * ) Notice: Subject to any disclaimer, the term of this patent is extended or adjusted under 35 U.S.C. 154(b) by 0 days.

(21) Appl. No.: 18/674,811

(22) Filed: May 24, 2024

(65) Prior Publication Data

US 2024/0351321 A1 Oct. 24, 2024

(30) Foreign Application Priority Data

Oct. 9, 2023 (CN) ........................ 202322710623.5

(51) Int. Cl.

*B32B 37/00* (2006.01)
*B29C 63/00* (2006.01)
*B29C 65/00* (2006.01)

(52) U.S. Cl.

CPC .. *B32B 37/0046* (2013.01); *B29C 2063/0008* (2013.01); *B29C 63/0047* (2013.01); *B29C 66/342* (2013.01); *B29C 66/345* (2013.01); *B32B 37/003* (2013.01); *B32B 2457/20* (2013.01)

(58) Field of Classification Search

CPC . B29C 66/342; B29C 66/345; B29C 63/0047; B29C 2063/0008; B32B 37/003; B32B 2457/20; B32B 2457/202; B32B 2457/206; B32B 2457/208

USPC .................................................. 206/320, 576

See application file for complete search history.

(56) References Cited

U.S. PATENT DOCUMENTS

2019/0047815 A1* 2/2019 Kim ........................... C09J 7/00
2023/0182458 A1* 6/2023 Zhou ................... B32B 37/0046 156/212
2023/0405917 A1 12/2023 Mo

FOREIGN PATENT DOCUMENTS

CN 220221297 U 12/2023
JP 3193806 U * 10/2014

* cited by examiner

*Primary Examiner* — Carson Gross

(57) ABSTRACT

An integrated dust-free reverse film application box includes a main body. The main body includes a foldable packaging box, which includes a lower cover plate, an upper cover plate, and a connecting plate. First and second mobile phone frames are provided on an inner side of the upper cover plate and an inner side of the lower cover plate, respectively. The first mobile phone frame is provided with a first limit slot and a positioning slot. The second mobile phone frame is provided with a second limit slot with a film assembly and a positioning column corresponding to the positioning slot. Snap slots and snap parts are symmetrically provided on both sides of each of the first mobile phone frame and the second mobile phone frame, respectively. The positioning column is provided at an end of the second mobile phone frame near the first mobile phone frame.

5 Claims, 4 Drawing Sheets

INTEGRATED DUST-FREE REVERSE FILM APPLICATION BOX

CROSS-REFERENCE TO RELATED APPLICATIONS

This application claims the benefit of priority from Chinese Patent Application No. 202322710623.5, filed on Oct. 9, 2023. The content of the aforementioned application, including any intervening amendments thereto, is incorporated herein by reference in its entirety.

TECHNICAL FIELD

This application relates to film application technology, and more particularly to an integrated dust-free reverse film application box.

BACKGROUND

Screen protectors, also known as mobile phone beauty films or mobile phone protective films, are a kind of cold lamination films that can be applied onto the phone body and screen, and other tangible objects. In terms of function, they can be classified into screen protectors and body protectors for mobile phones. The protection film only has the scratch-resistant function at the original stage, but currently, there are a wide variety of commercially-available functional protective films such as privacy films, mirror films, augmented reality (AR) films, frosted film films, high-definition films, anti-scratch protective films, three-dimensional (3D) films, Polymethylmethacrylate (PMMA) soft films, phone body anti-scratch protective films, diamond films, and tempered glass films.

However, during the traditional film application process of smartphones, the film is usually peeled off and applied to the fixed phone surface along a locator, and then pressed and wiped manually to achieve the tight adhesion. However, bubbles often form between the film and the screen, which will affect the appearance and touch sensitivity, leading to poor film-application effectiveness.

SUMMARY

A purpose of the present application is to provide an integrated dust-free reverse film application box to solve the above problems.

To achieve the above object, the present disclosure adopts the following technical solutions.

This application provides an integrated dust-free reverse film application box, comprising:

a main body;

wherein the main body comprises a packaging box with a folding structure; the packaging box comprises a lower cover plate, an upper cover plate, and a connecting plate; a first mobile phone frame is provided on an inner side of the upper cover plate; a second mobile phone frame is provided on an inner side of the lower cover plate;

the first mobile phone frame is provided with a first limit slot; a first snap slot is provided on a first side of the first mobile phone frame; a second snap slot is provided on a second side of the first mobile phone frame; the first snap slot and the second snap slot are symmetrically arranged; a first snap part is provided on the first side of the first mobile phone frame; a second snap part is provided on the second side of the first mobile phone frame; the first snap part and the second snap part are symmetrically arranged; the first mobile phone frame is further provided with a positioning slot; an end of the second mobile phone frame near the first mobile phone frame is provided with a positioning column; and the positioning slot is corresponding to the positioning column; and the second mobile phone frame is provided with a second limit slot; a film assembly is provided inside the second limit slot; a third snap slot is provided on a first side of the second mobile phone frame; a fourth snap slot is provided on a second side of the second mobile phone frame; the third snap slot and the fourth snap slot are symmetrically arranged; a third snap part is provided on the first side of the second mobile phone frame; a fourth snap part is provided on the second side of the second mobile phone frame; the third snap part and the fourth snap part are symmetrically arranged; the film assembly comprises a protective film; a pull tab is provided at a middle of an upper surface of the protective film along a longitudinal direction of the protective film; and a positioning film is provided on a lower surface of the protective film.

In an embodiment, the connecting plate is provided between the lower cover plate and the upper cover plate; and the connecting plate is fixedly and foldably connected to the lower cover plate and the upper cover plate.

In an embodiment, the second mobile phone frame is arranged corresponding to the first mobile phone frame In an embodiment, the packaging box is provided with a hook and a sealing sticker, and the hook is provided on the connecting plate in a snap-fit manner.

In an embodiment, the positioning film has a T-shaped structure; a first positioning hole is provided at an end of the positioning film away from the pull tab, and is sleeved on the positioning column; a second positioning hole is provided on a first side of the positioning film; a third positioning hole is provided on a second side of the positioning film; the second positioning hole is sleeved on the third snap part; and the third positioning hole is sleeved on the fourth snap part.

In an embodiment, the third snap part is arranged corresponding to the first snap slot, and the fourth snap part is arranged corresponding to the second snap slot to allow plug-in connection between the third snap part and the first snap slot and plug-in connection between the fourth snap part and the second snap slot.

In an embodiment, the first snap part is arranged corresponding to the third snap slot, and the second snap part is arranged corresponding to the fourth snap slot to allow plug-in connection between the first snap part and the third snap slot and plug-in connection between the second snap part and the fourth snap slot.

In an embodiment, a length of the pull tab is greater than a length of the protective film.

The benefits of this present application are described as follows. Due to the configuration of this film application box, film application is achieved in a sealed space, effectively improving the success rate of the application. It features smooth air expulsion and simple, convenient operation, allowing the film to be applied in an enclosed space.

DETAILED DESCRIPTION OF EMBODIMENTS

The technical solutions in the embodiments of the present disclosure will be clearly and completely described below with reference to the accompanying drawings. Obviously, described below are merely some embodiments of the present disclosure rather than all embodiments. Based on the embodiments provided herein, all other embodiments obtained by those skilled in the art without making creative efforts shall fall within the scope of the present disclosure.

Figure 1:
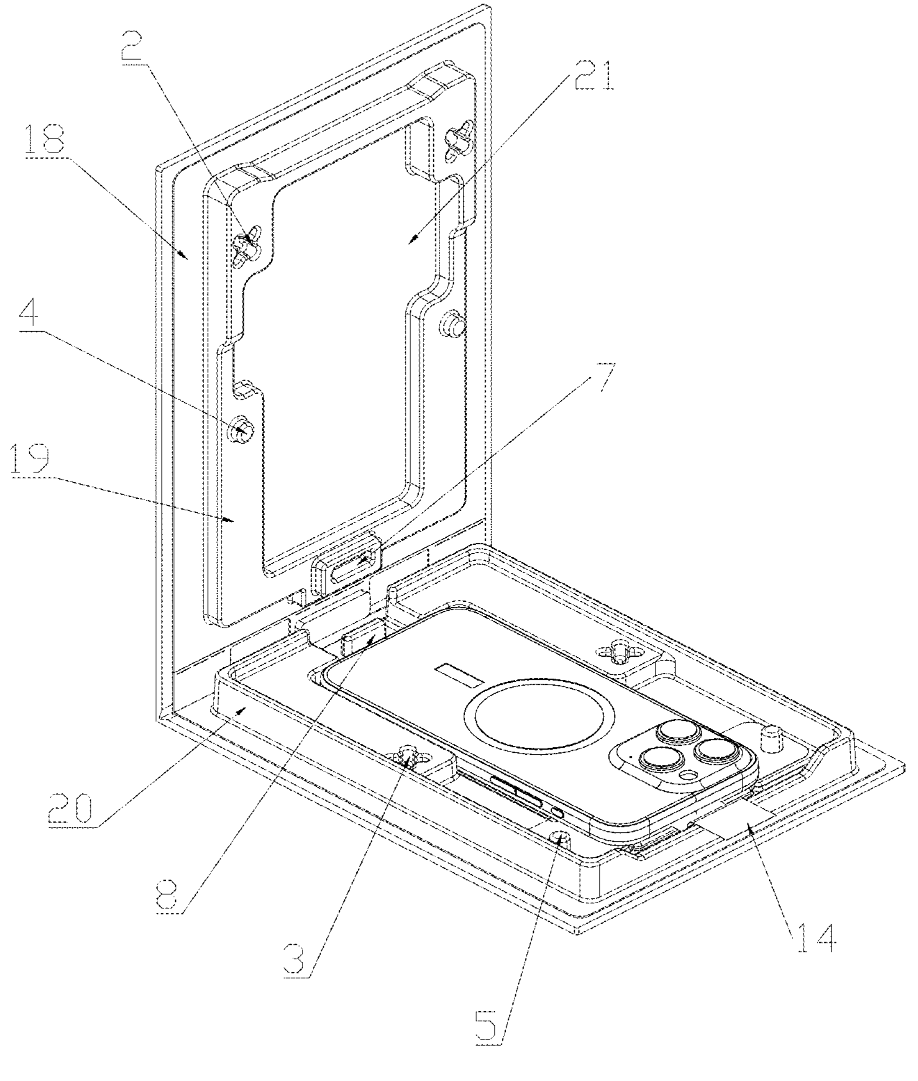
FIG. 1 illustrates the integrated dust-free reverse film application box according to an embodiment of the present application in a 90-degree open state.
Figure 2:
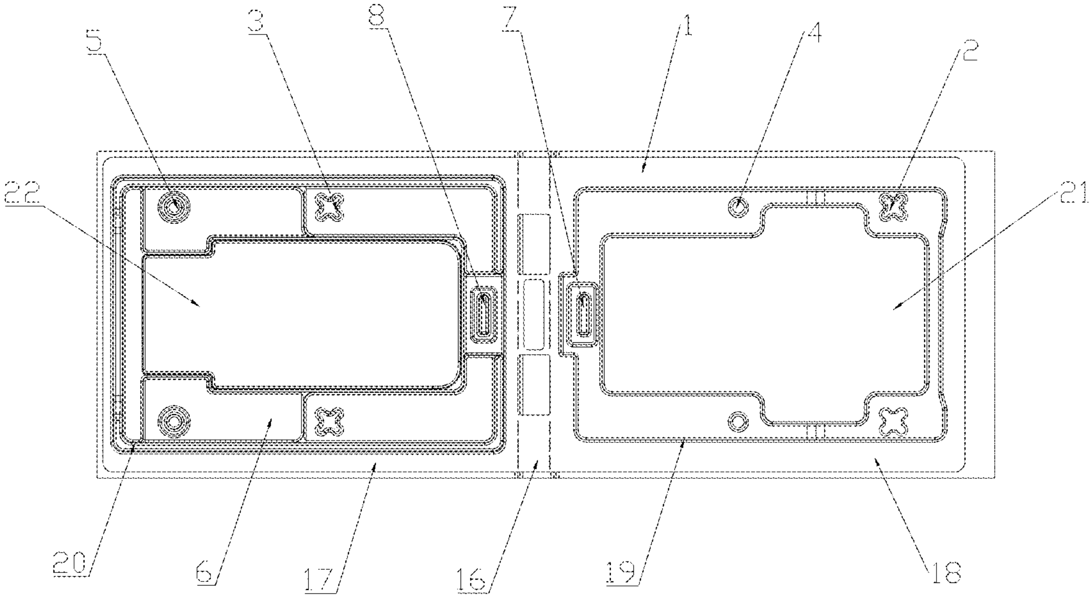
FIG. 2 illustrates the integrated dust-free reverse film application box according to an embodiment of the present application in a 180-degree open state.
Figure 3:
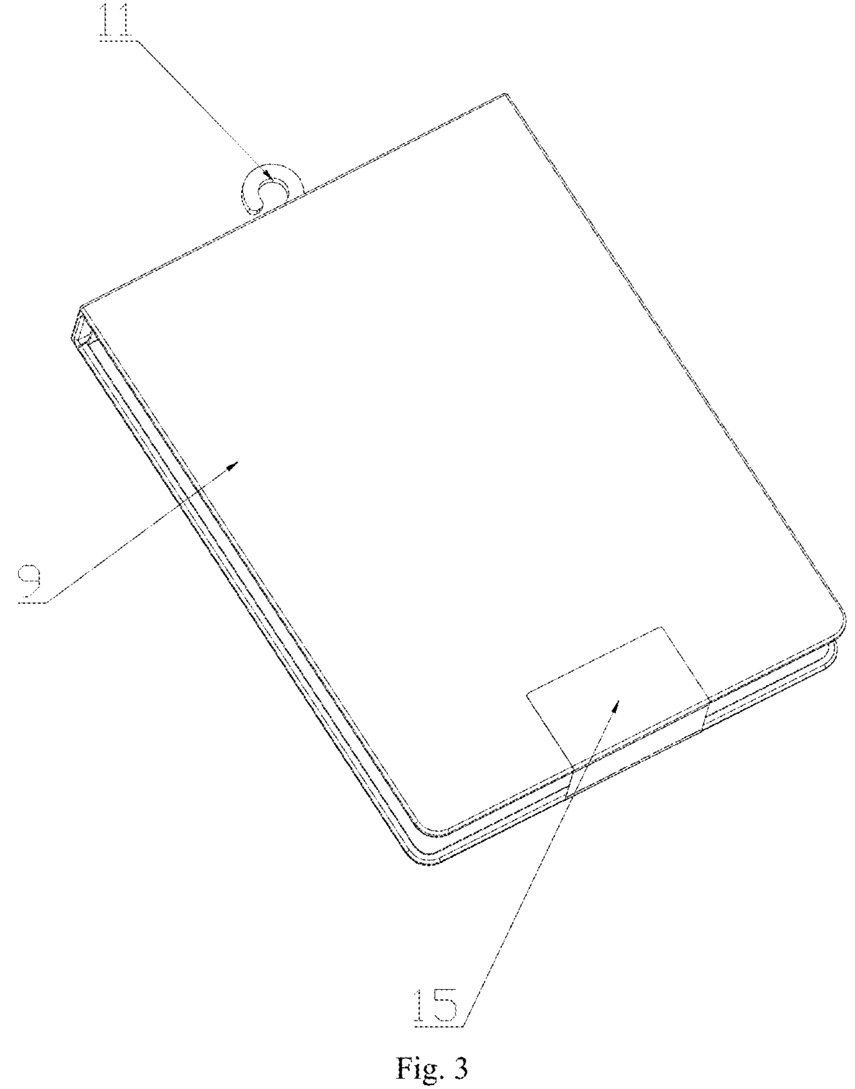
FIG. 3 illustrates the integrated dust-free reverse film application box according to an embodiment of the present application in a folded state.
Figure 4:
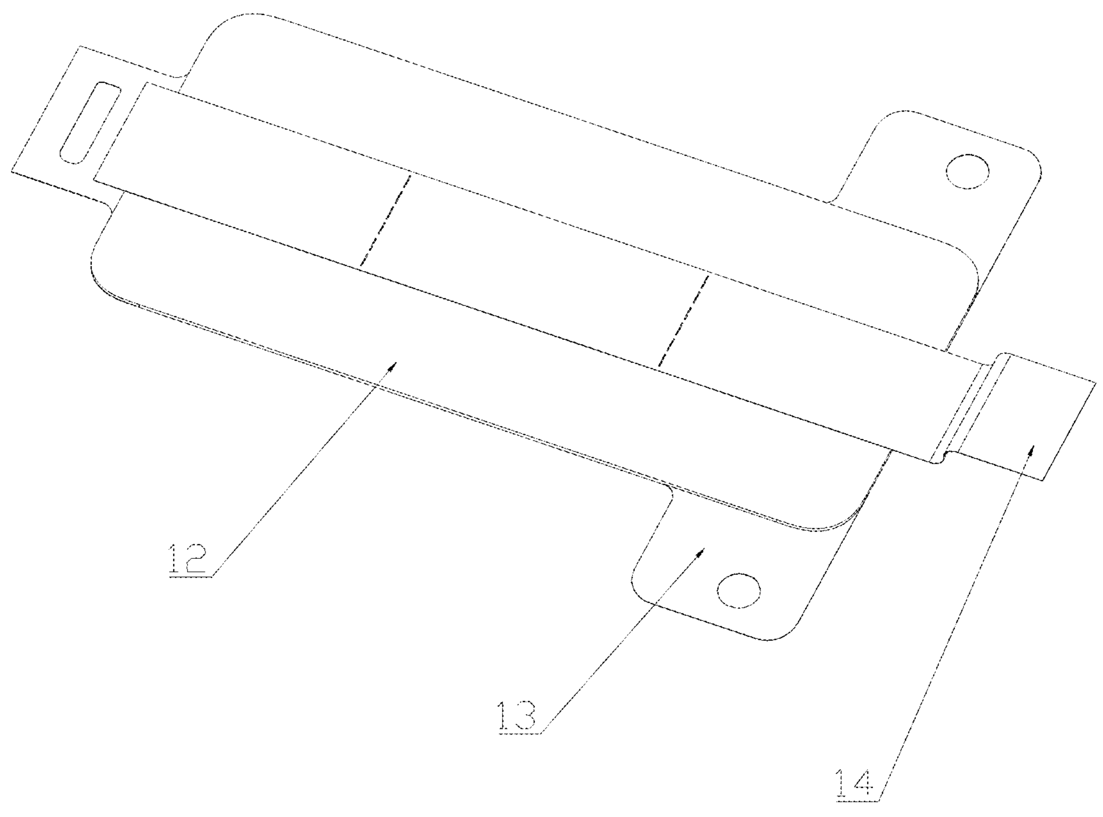
FIG. 4 is a structural diagram of the film assembly according to an embodiment of the present application.

Referring to an embodiment shown in FIGS. 1-4, an integrated dust-free reverse film application box is provided, which includes a main body. The main body includes a packaging box 9 with a folding structure. The packaging box 9 includes a lower box cover plate 17, an upper box cover plate 18, and a connecting plate 16. The connecting plate 16 is arranged between the upper box cover plate 18 and the lower box cover plate 17. A second mobile phone frame 20 is provided on an inner side of the lower box cover plate 17 and is fixedly connected to the lower box cover plate 17. A first mobile phone frame 19 is provided on an inner side of the upper box cover plate 18 and is fixedly connected to the upper box cover plate 18. The second mobile phone frame 20 is provided with a second mobile phone limit slot 22. A film assembly is provided inside the second mobile phone limit slot 22. The film assembly is non-fixed within the second mobile phone limit slot 22. A mobile phone is arranged inside the second mobile phone limit slot 22, and its screen surface adheres to the film assembly. A third snap slot 3 is provided on a first side of the second mobile phone frame 20, a fourth snap slot is provided on a second side of the second mobile phone frame 20, the third snap slot 3 and the fourth snap slot symmetrically arranged, a third snap part 5 is provided on the first side of the second mobile phone frame 20, a fourth snap part is provided on the second side of the second mobile phone frame 20, and the third snap part 5 and the fourth snap part symmetrically arranged. The positioning column 8 is provided at an end of the second mobile phone frame 20 near the first mobile phone frame 19, the film assembly includes a protective film 12. A pull tab 14 is provided at the middle of an upper surface of the protective film 12 along a longitudinal direction, and a positioning film 13 is provide on a lower surface of the protective film 12. The first mobile phone frame 19 is provided with a first mobile phone limit slot 21, a first snap slot 2 is provided on a first side of the first mobile phone frame 19, a second snap slot is provided on a second side of the first mobile phone frame 19, the first snap slot 2 and the second snap slot are symmetrically arranged, a first snap part 4 is provided on the first side of the first mobile phone frame 19, a second snap part is provided on the second side of the first mobile phone frame 19, the first snap part 4 and the second snap part are symmetrically arranged. The first mobile phone frame 19 is provided with a positioning slot 7 that is arranged responding to the positioning column 8. When the box is folded, the positioning column 8 is inserted into the positioning slot 7, and the first mobile phone limit slot 21 abuts against the rear surface of the mobile phone.

The connecting plate 16 is arranged between the upper box cover plate 18 and the lower box cover plate 17. The connecting plate 16 is fixedly and foldably connected to the lower box cover plate 17 and the upper box cover plate 18. When the box is folded, the upper box cover plate 18 is parallel to the lower box cover plate 17. The connecting plate 16 is arranged at the end of the lower box cover plate 17, and the end of the upper box cover plate 18. The connecting plate 16 is perpendicular to the lower box cover plate 17 and the upper box cover plate 18. The second mobile phone frame 20 is arranged corresponding to the first mobile phone frame 19. When the box is folded, the first mobile phone frame 19 is located inside the second mobile phone frame 20. The packaging box 9 is provided with a hook 11 and a sealing sticker 15, and the hook 11 is provided on the connecting plate 16 in a snap-fit manner. The sealing sticker 15 is bonded and connected to the lower box cover plate 17 and the upper box cover plate 18. The positioning film 13 has a T-shaped structure, and a first positioning hole is provided at the end of the positioning film 13 away from the pull tab and is sleeved on the positioning column 8. A second positioning hole is provided on a first side of the positioning film 13, a third positioning hole is provided on a second side of the positioning film 13. The second positioning hole is sleeved on the third snap part 5, and the third positioning hole is sleeved on the fourth snap part, so as to achieve limit installation of the protective film 12. The third snap part 5 is arranged corresponding to the first snap slot 2, and the fourth snap part is arranged corresponding to the second snap slot to allow plug-in connection between the third snap part and the first snap slot and plug-in connection between the fourth snap part and the second snap slot. The first snap part 4 is arranged corresponding to the third snap slot 3, and the second snap part is arranged corresponding to the fourth snap slot to allow plug-in connection between the first snap part and the third snap slot and plug-in connection between the second snap part and the fourth snap slot. When the box is folded, the limit connection between the lower box cover plate 17 and the upper box cover plate 18 can be achieved. The length of the pull tab 14 is greater than the length of the protective film 12. A folding line is provided at the middle of the pull tab 14 and is in folding before use. the pull tab 14 is provided at the middle of the protective film 12. The unfold end of the pull tab 14 extends to the outside of the lower box cover plate 17. When the lower box cover plate 17 and the upper box cover plate 18 are folded, the pull tab 14 at the connection between the second mobile phone frame 20 and the first mobile phone frame 19 is in a bent state.

Operation Principle

Firstly, the sealing sticker 15 is torn off, the upper box cover plate 18 is folded and opened, and pull tab 14 is straightened. The phone (or other devices) is then placed into the second mobile phone limit slot 22 with its screen facing down. Then the upper box cover plate 18 is folded, and a tight connection between the upper box cover plate 18 and the lower box cover plate 17 can be achieved by fitting the third snap part 5 with the first snap slot 2, the fourth snap part with the second snap slot, the first snap part 4 with the third snap slot 3, and the second snap part to the fourth snap slot. Finally, the pull tab 14 is pulled out and the upper box cover plate 18 is opened to remove the phone and the positioning film 13 to complete the application of the protective film. Specifically, through the combination of the positioning column 8, the third snap part 5 and the fourth snap part, a first positioning hole on the end of the positioning film 13 away from the pull tab is sleeved on the positioning column 8, a second positioning hole on the first side of the positioning film 13 is sleeved on the third snap part 5, a third positioning hole on the second side of the positioning film 13 is sleeved on the fourth snap part, so as to achieve three-point positioning for reverse film application. During the film application process, the protective film 12 gradually adheres to the screen of the phone through the weight of the phone, achieving a better air expulsion effect. This process does not require a roller or pressing to assist in air expulsion. The height of the box is designed to be 2 mm higher than the phone. When pulling the pull tab 14, a base film is pulled open and one end of the phone will be lifted by the base film below. As the pull tab is pulled to a certain distance, due to the weight of the phone, the screen of the phone will start to contact and adhere to the protective film 12 at an angle until the base film is completely pulled out from the protective film 12. As the base film is pulled out along with the pull tab 14, the whole processes of the air expulsion and film application for the phone and the protective film 12 are automatically completed within the film application box.

For those skilled in the art, it is evident that the present application is not limited to the details of the exemplary embodiments described above, and the present application can be realized in other specific forms without departing from the spirit or basic principle of the present application. Therefore, the above embodiments are merely exemplary, and are not intended to limit the present application. The scope of the present application is defined by the appended claims rather than the above description. Hence, all modifications and replacements that fall within the equivalent meaning and range of the claims shall fall within the scope of the disclosure defined by the appended claims.

Moreover, it should be understood that although the description is presented with reference to embodiments, not every embodiment only includes a single and independent technical solution. This descriptive approach is merely for clarity. Those skilled in the art should consider the description as a whole, and the technical solutions in individual embodiments can also be appropriately combined to form other embodiments understood by those skilled in the art.

What is claimed is:

1. An integrated dust-free reverse film application box, comprising:

a main body;

wherein the main body comprises a packaging box with a folding structure; the packaging box comprises a lower cover plate, an upper cover plate, and a connecting plate; a first mobile phone frame is provided on an inner side of the upper cover plate; a second mobile phone frame is provided on an inner side of the lower cover plate;

the first mobile phone frame is provided with a first limit slot; a first snap slot is provided on a first side of the first mobile phone frame; a second snap slot is provided on a second side of the first mobile phone frame; the first snap slot and the second snap slot are symmetrically arranged; a first snap part is provided on the first side of the first mobile phone frame; a second snap part is provided on the second side of the first mobile phone frame; the first snap part and the second snap part are symmetrically arranged; the first mobile phone frame is further provided with a positioning slot; an end of the second mobile phone frame near the first mobile phone frame is provided with a positioning column; and the positioning slot is corresponding to the positioning column; and the second mobile phone frame is provided with a second limit slot; a film assembly is provided inside the second limit slot; and the second limit slot is further configured to receive a mobile phone above the film assembly with a screen of the mobile phone facing downward toward the film assembly;

a third snap slot is provided on a first side of the second mobile phone frame; a fourth snap slot is provided on a second side of the second mobile phone frame; the third snap slot and the fourth snap slot are symmetrically arranged; a third snap part is provided on the first side of the second mobile phone frame; a fourth snap part is provided on the second side of the second mobile phone frame; the third snap part and the fourth snap part are symmetrically arranged;

the third snap part is arranged corresponding to the first snap slot, and the fourth snap part is arranged corresponding to the second snap slot to allow plug-in connection between the third snap part and the first snap slot and plug-in connection between the fourth snap part and the second snap slot; and the first snap part is arranged corresponding to the third snap slot, and the second snap part is arranged corresponding to the fourth snap slot to allow plug-in connection between the first snap part and the third snap slot and plug-in connection between the second snap part and the fourth snap slot;

the film assembly comprises a protective film; a pull tab is provided at a middle of an upper surface of the protective film along a longitudinal direction of the protective film; and a positioning film is provided on a lower surface of the protective film;

the positioning film has a T-shaped structure; a first positioning hole is provided at an end of the positioning film away from the pull tab, and is sleeved on the positioning column; a second positioning hole is provided on a first side of the positioning film; a third positioning hole is provided on a second side of the positioning film; the second positioning hole is sleeved on the third snap part; and the third positioning hole is sleeved on the fourth snap part; and during pulling out of the pull tab, the protective film adheres to the screen of the mobile phone under the weight of the mobile phone positioned above the protective film.

2. The integrated dust-free reverse film application box of claim 1, wherein the connecting plate is provided between the lower cover plate and the upper cover plate; and the connecting plate is fixedly and foldably connected to the lower cover plate and the upper cover plate.

3. The integrated dust-free reverse film application box of claim 1, wherein the second mobile phone frame is arranged corresponding to the first mobile phone frame.

4. The integrated dust-free reverse film application box of claim 1, wherein the packaging box is provided with a hook and a sealing sticker, and the hook is provided on the connecting plate in a snap-fit manner.

5. The integrated dust-free reverse film application box of claim 1, wherein a length of the pull tab is greater than a length of the protective film.

* * * * *